(12) United States Patent
Aubin et al.

(10) Patent No.: US 8,824,132 B2
(45) Date of Patent: Sep. 2, 2014

(54) ELECTRONIC DEVICE COMPRISING A REMOVABLE HARD DISK

(75) Inventors: Anthony Aubin, Bourgbarre (FR); Philippe Bouvet, St Sulpice la Foret (FR)

(73) Assignee: Thomson Licensing, Boulogne, Billancourt (FR)

( * ) Notice: Subject to any disclaimer, the term of this patent is extended or adjusted under 35 U.S.C. 154(b) by 117 days.

(21) Appl. No.: 13/135,902

(22) Filed: Jul. 18, 2011

(65) Prior Publication Data

US 2012/0026713 A1 Feb. 2, 2012

(30) Foreign Application Priority Data

Jul. 30, 2010 (FR) ...................................... 10 56317

(51) Int. Cl.
*H05K 7/00* (2006.01)
*G06F 1/16* (2006.01)
*G11B 33/12* (2006.01)

(52) U.S. Cl.
CPC ............ *G11B 33/124* (2013.01); *G06F 1/1658* (2013.01)
USPC ............. 361/679.39; 361/679.38; 361/679.33

(58) Field of Classification Search
CPC ....... G06F 1/1658; G06F 1/183; G06F 1/167; G11B 33/124; G11B 17/0405; G11B 17/0407
USPC ................................ 361/679.31–679.39, 747
See application file for complete search history.

(56) References Cited

U.S. PATENT DOCUMENTS

| | | | |
|---|---|---|---|
| 6,064,567 A | 5/2000 | Cheng | |
| 6,876,552 B2 * | 4/2005 | Pan et al. | 361/730 |
| 7,766,434 B2 * | 8/2010 | Cheng et al. | 312/223.2 |
| 2007/0014085 A1 * | 1/2007 | Meserth et al. | 361/685 |
| 2007/0053149 A1 * | 3/2007 | Guo et al. | 361/685 |
| 2007/0247802 A1 | 10/2007 | Imsand | |

(Continued)

FOREIGN PATENT DOCUMENTS

| | | |
|---|---|---|
| EP | 0763792 | 3/1997 |
| GB | 2462076 | 1/2010 |
| WO | WO9939349 | 8/1999 |

OTHER PUBLICATIONS

"TV on your computer: Understanding TV signals and TV tuners", http://windows.microsoft.com/en-us/windows-vista/tv-on-your-computer-understanding-tv-signals-and-tv-tuners, Oct. 11, 2009.*

(Continued)

*Primary Examiner* — Hoa C Nguyen
*Assistant Examiner* — Amol Patel
(74) *Attorney, Agent, or Firm* — Jeffrey D. Carter

(57) ABSTRACT

An electronic device comprises a casing, a hard disk, a housing on the casing of the electronic device intended to host the hard disk, and a stopper ensuring the holding of the hard disk in the housing. The stopper comprises a first fixation mechanism on a first end of the stopper to the casing of the electronic device, and a second fixation mechanism on a second end of the stopper to the casing of the electronic device. According to exemplary embodiments, the first fixation mechanism is a clip, the second fixation mechanism is a lock, and the stopper also comprises a hinge enabling the articulation of the stopper around its first end. According to another aspect of the invention, the device comprises a seal positioned on the stopper during the first assembly of the hard disk.

12 Claims, 5 Drawing Sheets

(56) References Cited

U.S. PATENT DOCUMENTS

2008/0278856 A1 11/2008 Peng et al.
2009/0273896 A1 11/2009 Walker et al.
2011/0255235 A1* 10/2011 Chen .................. 361/679.33
2011/0261524 A1* 10/2011 Wieder et al. ............ 361/679.31
2011/0299236 A1* 12/2011 Sun .......................... 361/679.36

OTHER PUBLICATIONS

France Search Report dated Feb. 9, 2011.

* cited by examiner

ELECTRONIC DEVICE COMPRISING A REMOVABLE HARD DISK

This application claims the benefit, under 35 U.S.C. §119 of FR Patent Application 1056317, filed 30 Jul. 2010.

DOMAIN OF THE INVENTION

The invention relates to the general domain of the mechanics of electronic devices. More specifically, the invention relates to an electronic device comprising a removable hard disk.

PRIOR ART

Today numerous electronic devices integrate hard disks to record data. In some countries, these devices are taxed differently according to whether or not they are equipped with hard disks.

In addition, to respond to the constraints of product costs and development time, an electronic device is a modular system that comprises a basic configuration and optional modules carrying out a specific function, for example storage on a hard disk.

In the domain of set top boxes, in the domain of video recorders, or more generally in that of receivers of audio and/or video signals (for example in a television), a basic function consists in presenting the audio and/or video signals on a screen and an optional function consists in storing the signals on a hard disk. According to different economic models, a television operator offers customers a rental or sale of decoders equipped or not equipped with a hard disk, an optional recording service accompanying for example the provision of a hard disk for the non-equipped decoder.

Thus, to respond at the same time to the problem of taxes and service offers, the set top boxes are offered with the recording module or PVR (Personal Video Recorder) but without a hard disk. According to different economic models, the user rents a decoder equipped with a hard disk from his television operator, the user rents a decoder then buys a hard disk from his television operator, or the user buys a decoder from his operator and buys a hard disk from a computing outlet. An electronic device equipped or not with a hard disk is desirable.

Different solutions of assembly of removable hard disks in devices are possible but not always compatible with the exigencies of costs, ease of use by the user and security. Thus, from the domain of personal computing, a metallic unit is known comprising a rail, along which the hard disk slides. The hard disk is maintained in the unit by a locking system. According to different embodiment variants, the solution is advantageously completed by a mechanism for ejection of the hard disk conditioned by pressure on a push button, an anti-vibration mechanism and an electrostatic protection mechanism. The documents US20080080130A1 "Quick plug/eject concept SATA hard disk drive rack" by Chen and US20090161309A1 "Removable hard disk drive casing" by Yang describe such solutions. However the cost of these solutions is high and often difficult to integrate in products such as audio/video signal receivers. The document KR616171B1 "Digital video recorder with an attachable hard disk driver" by Hwang, describes a solution for an audio/video digital recorder. This solution uses a tray, in which the user places the hard disk that slides exterior to the recorder passing via a frontal slider. This solution has the disadvantage of assembly unreliability, its cost and its compatibility with the different hard disk types.

In view of these disadvantages, a simple solution and inexpensive assembly of a removable hard disk in an electronic device is thus desirable.

SUMMARY OF THE INVENTION

The purpose of the invention is to overcome at least one of the disadvantages of the prior art by proposing an electronic device comprising a casing, a housing on the casing for the electronic device intended to host a hard disk, a stopper ensuring the maintenance of the hard disc in said housing. The stopper is notable in that it comprises a first fixation means of a first end of the stopper to the casing of the electronic device, a second fixation means of a second end of the stopper to the casing of the electronic device. The stopper is thus firmly attached onto the casing at two points and maintains the hard disk in its housing on the casing of the device. The assembly of the hard disk according to this embodiment of the invention, has the advantage of simplicity, security with respect to falls and vibrations and protection of the hard disk in its housing.

The principle of the invention is to pose the hard disk in a housing of the casing accessible via a slider without use of a specific support such as a metallic unit or a tray. The maintenance of the hard disk in its housing is ensured by a simple and sole stopper. Thus the number, complexity and cost of parts used in the assembly of the removable hard disk are significantly reduced.

According to a particular characteristic of the invention, the first fixation means is a clip. The clip enables 2 parts to be firmly and simply attached, notably the stopper and one of its ends and the casing.

According to another particular characteristic of the invention, the second fixation means is a lock. The lock enables the stopper to be maintained in closed position on the casing.

According to another particular characteristic of the invention, the stopper also comprises a hinge allowing the articulation of the stopper around the first end. The stopper is thus easily moved in open or closed position while remaining attached to the casing by the first fixation means. Only the second fixation means or the lock is removed. The risks of breakage at the clip level during its insertion or its removal are reduced for this embodiment. This characteristic also has great ease of use for the opening and closing of the stopper during the set-up of the hard disk by the user.

According to another particular characteristic of the invention, the stopper also comprises a flexible arm maintaining the hard disk on the base of the housing by pressure. This characteristic performs at low cost the anti-vibration function of the hard disk. This embodiment of the anti-vibration function is compatible with 2.5" standard type hard disks or with the new generation 2.5" slim type hard disks. In fact the flexible arm anti-vibration solution is particularly well adapted to a variation in the thickness of the hard disk.

According to a particular embodiment of the invention, the stopper, the clip, the lock and the hinge are in one piece of plastic. According to another particular embodiment of the invention, the stopper, the lock, the hinge and the flexible arm are in one piece of plastic. The stopper and its different elements can be manufactured by plastic moulding. These embodiments have the advantage of the low manufacturing cost of the stopper and its different elements and the simplicity of the assembly. These advantages respond to the exigencies of production particularly of audio/video receivers, of decoders.

According to another particular embodiment of the invention, the device also comprises a seal. The seal is positioned on the stopper at a first assembly of the hard disk. In a particular embodiment of the seal, it comprises a screw and a label. The stopper comprises a hole enabling the passage of the screw. The stopper is screwed onto the casing of the electronic device and the label is attached over the screw. Thus the screw enables the access to the disk to be locked more securely. The screw is an advantageous characteristic for the transport of a device equipped with a hard disk. In fact, the hard disk is protected against shocks related to transport between the factory and the user. In addition the disk is more securely maintained in its housing at its arrival at the user residence. But in principle, no screws are necessary to maintain the disk in complete security. The absence of a screw is an advantageous characteristic if the user assembles the hard disk himself. In fact no tools are then necessary and a user who has not been alerted in advance can easily equip a decoder. A torn label indicates that the disk has been previously taken out. This is the principle of the seal. These embodiments are particularly well adapted when the operator delivers decoders with hard disks. The seal is put in place at assembly in the factory, access to the hard disk is prohibited to the customer. In the case of a decoder breakdown, the after-sales service checks if the hard disk has been removed using the seal, for example by checking that the label placed over the screw is not torn.

According to another particular embodiment of the invention, the base of the housing is metallic. The hard disk is in contact with the base of the housing, according to a variant, maintained there by a flexible arm. The metal being an electrical conductor, the ground of the hard disk and the ground of the electronic device are thus easily connected advantageously protecting the device from electrostatic and electromagnetic discharges. In addition, the metal being a thermal conductor, the re-cooling of the hard disk is also ensured. According to a variant, the metallic base comprises at least one leaf spring. This variant has the advantage of improving the ground contact between the hard disk and the metallic base of the housing.

According to another particular embodiment of the invention, the electronic device is a receiver receiving video and/or audio signals.

BRIEF DESCRIPTION OF THE FIGURES

The invention will be better understood and illustrated by means of embodiments and advantageous implementations, by no means limiting, with reference to the figures in the appendix, wherein.

DETAILED DESCRIPTION OF EMBODIMENTS OF THE INVENTION

Figure 1:
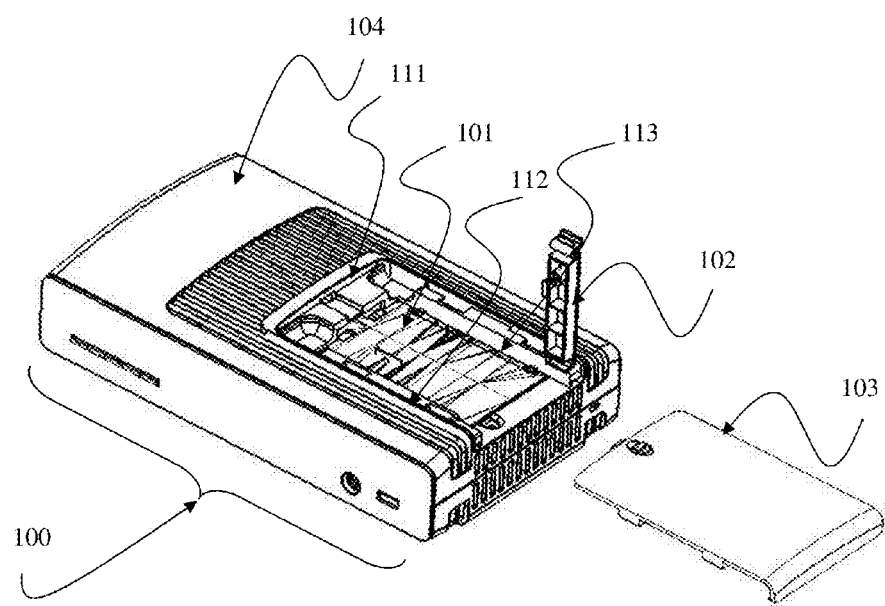
FIG. 1 shows an electronic device according to an embodiment.

FIG. 1 shows an electronic device 100 according to an embodiment. The electronic device 100 comprises a casing 104, a slider 103 leading to a housing 101 in the casing 104. This housing is intended to host a hard disk or any other removable storage device such a mass storage memory. The slider 103 covers the housing, the hard disk inserted in its housing as well as the means of holding the hard disk. In different embodiments, the slider is positioned above, on a side or in combination, as shown in FIG. 1, above and extending over the side of the electronic device. The access to the disk by the user is thus made easy as the access can be made without moving the device. The housing on the casing has a slot for a connector, for example of SATA type, adapted for hard disk inputs/outputs. The housing comprises a lateral guide facilitating the insertion of the hard disk by translation or slide and holding the disk laterally. The housing comprises fixed first 112 and second 113 lateral walls, opposite one another with respect to the disk and parallel to the fixed direction of the lateral guide. According to a variant, in the housing, the hard disk presses on a metallic part in contact with the electronic board of the device. The metallic part is connected to the ground plane. In an improvement the metallic part comprises leaf springs that improve the contact between the metallic part and the hard disk. The metallic part constitutes the base of the housing. According to another variant, the hard disk presses on a guide plane in the casing laid around the housing. The guide thus constitutes the base of the housing.

The device also comprises a front stopper 102 and a rear stopper 111 opposite one another and ensuring the holding of the hard disk in the housing in accordance with the guide direction. Thus the rear stopper 111 blocks the translation of the disk in accordance with the direction sense during the insertion. The front removable stopper 102 blocks the translation of the disk in accordance with the guide direction during the extraction. The disk is thus blocked in translation in accordance with the two guide direction senses (insertion/extraction) when the two stoppers are in place. In FIG. 1, the front stopper 102 is fixed at one of its ends to the casing 104 or more specifically fixed to a lateral wall of the housing inside the casing. The front stopper is shown in open position and the other end is not fixed to the casing. The device is ready to receive the hard disk. Advantageously, the connector is placed in parallel with the rear stopper 111, the disk resting on the rear stopper being connected to the device. The rear stopper is, according to an embodiment shown in FIG. 1 fixed. According to a variant, the rear stopper is removable and implemented according to one of the embodiments of the front removable stopper.

Figure 2:
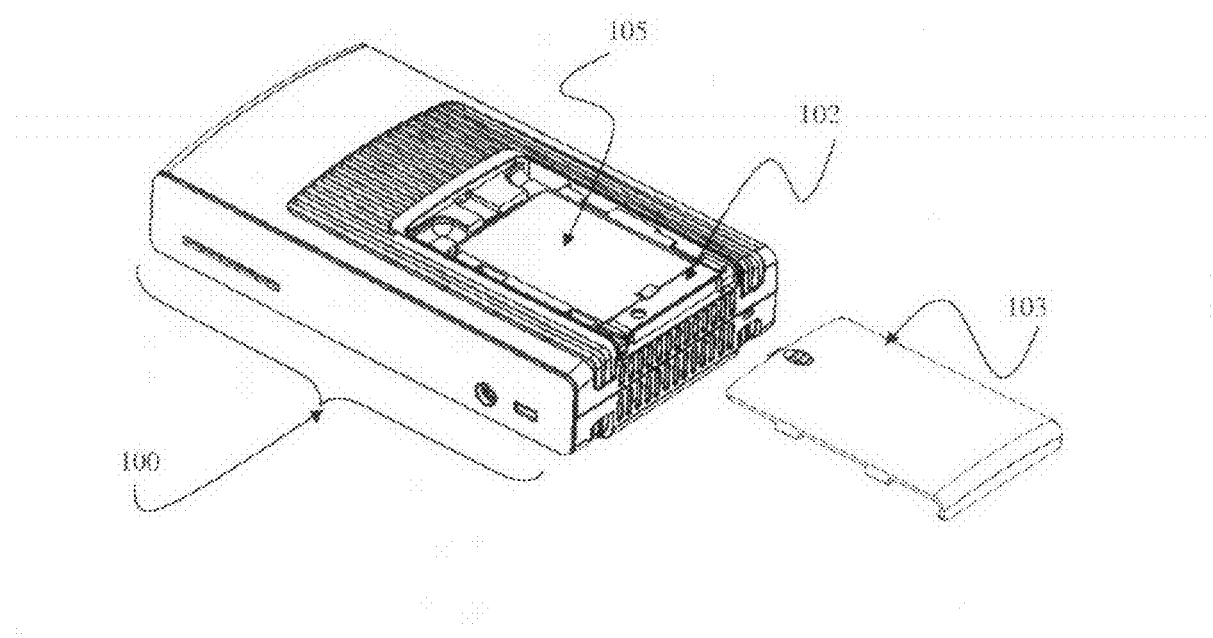
FIG. 2 shows the same electronic device as in FIG. 1 equipped with a hard disk.

FIG. 2 shows the same electronic device as that in FIG. 1 but comprising a hard disk. The hard disk 105 is placed in the housing. It is connected to the device. In FIG. 2, the front stopper 102 is fixed at both of its ends to the casing 104 or more specifically fixed to the two lateral walls of the housing inside the casing. The front stopper is shown in closed position. The disk is held in the housing due to lateral walls in a first lateral direction, to front and rear stoppers in the direction of the guide and finally to the base of the housing and to the casing or to the arm of the removable front stopper in a third direction.

Figure 3:
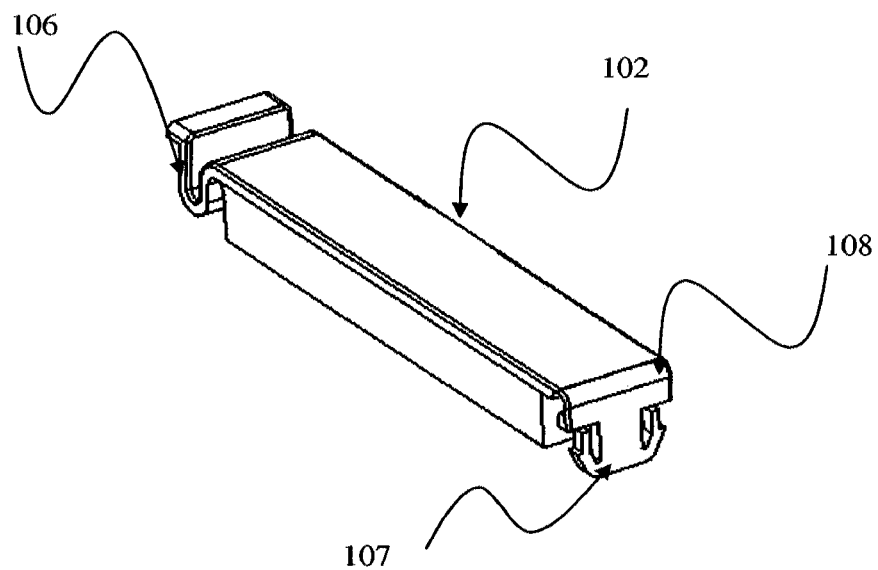
FIG. 3 shows the stopper according to an embodiment.

FIG. 3 shows the removable stopper according to an embodiment. The stopper comprises a first fixation means which is a clip 107, a second fixation means which is a lock 106, a hinge 108 enabling the articulation of the stopper around its first end. According to a variant, the stopper is in plastic because this material has useful elastic properties. According to another variant, the stopper, the clip, the lock and the hinge are one moulded plastic piece. Different embodiments of fixation means of the stopper are known to those skilled in the art of electronic device mechanics and are not described here.

Figure 4:
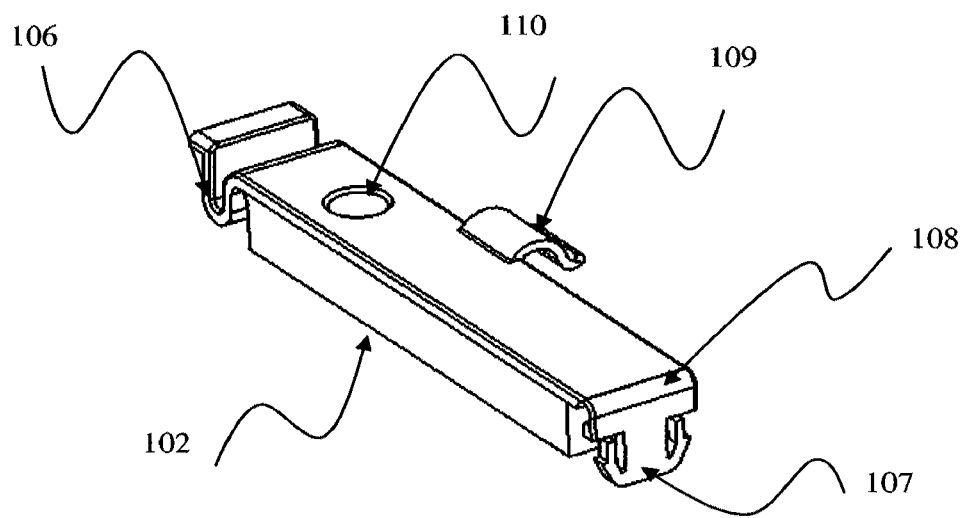
FIGS. 4 and 5 show the stopper according to another embodiment.

FIG. 4 shows the removable stopper according to another embodiment. The stopper comprises the same elements as in FIG. 3 and in addition a flexible arm 109 holding by pressure the hard disk on the base of the housing, a hole 110 enabling the passage of a screw. According to a variant, the stopper, the clip, the lock, the hinge and the flexible arm are one moulded plastic piece.

Figure 5:
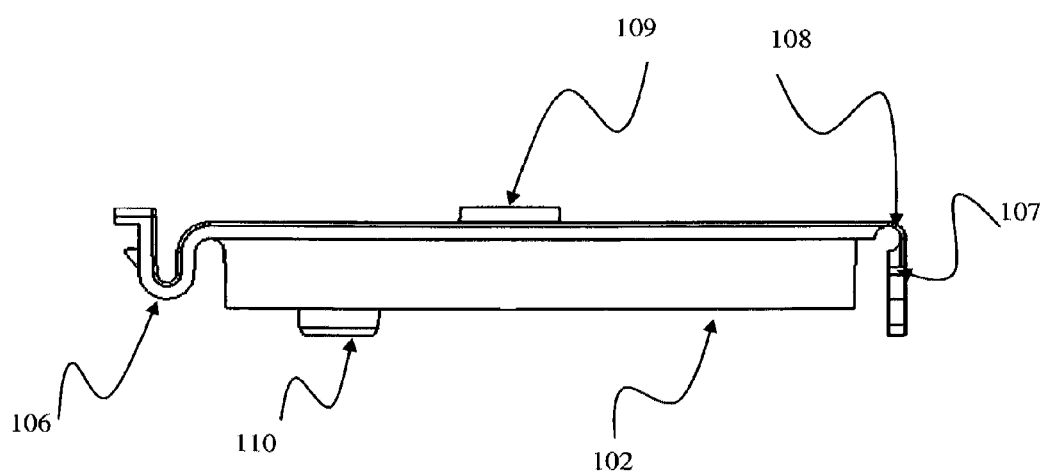

FIG. 5 shows a longitudinal cross-section of the stopper according to this same other embodiment. In particular, the hinge 108 is produced by reducing the thickness of the stopper for example in plastic after the clip. This thickness itself provides elastic properties enabling the bending of the piece from 0 to 180 degrees. An adapted plastic material advantageously has a resistance to the repetition of the opening and the closing of the stopper. FIG. 5 shows a known solution to produce a lock: a U form with a tooth acting as a catch inserted into a slot on the casing.

The steps of the assembly of a hard disk in a device according to a particular embodiment are described in reference to FIG. 1 and FIG. 2. In a first step, the user removes the slider 103 from the device 100. In a second step, the user opens the lock 106 and releases the stopper 102 around its hinge 108. The state attained after the second step is shown in FIG. 1. In a third step, the user places the hard disc 105 in its housing 101 via a translation movement according to the guide direction. In a fourth step, the user ensures that the hard disk is correctly connected to the device. In a fifth step, the user closes the front stopper 102 and puts the lock in position 106. The state attained after the fifth step is shown in FIG. 2. In a sixth step, the user replaces the protective slider on the casing 104 of the device 100. The device is equipped with the hard disk.

Naturally, the invention is not limited to the embodiments previously described. In particular, the invention is compatible with different fixation means at the ends of the stopper, different housing forms and different storage types other than the hard disk.

What is claimed is:

1. An electronic device, comprising:
   a casing;
   a housing on said casing of said electronic device for hosting a removable hard disk drive, said housing comprising first and second fixed lateral walls opposite one another with respect to said removable hard disk drive, and means for sliding said removable hard disk drive into said housing according to a fixed guide direction parallel to said first and second fixed lateral walls; and
   a rear stopper and a removable front stopper positioned opposite one another with respect to said removable hard disk drive and positioned to lock said removable hard disk drive in said housing according to said fixed guide direction, wherein said rear stopper is adapted to block sliding movement of said removable hard disk drive according to a first sense of said fixed guide direction and said removable front stopper is adapted to block sliding movement of said removable hard disk drive according to a second sense of said fixed guide direction, said second sense being opposed to said first sense;
   wherein said removable front stopper comprises:
   a first fixation element on a first end of said removable front stopper coupled to said first fixed lateral wall, wherein said first fixation element is a clip;
   a second fixation element on a second end of said removable front stopper coupled to said second fixed lateral wall, wherein said second fixation element is a lock;
   a hinge enabling articulation of said removable front stopper around said first end; and
   a flexible arm holding by pressure said removable hard disk drive on a base of said housing, wherein said removable front stopper is a unitary plastic piece.

2. The electronic device according to claim 1 wherein a base of said housing is metallic.

3. The electronic device according to claim 1 further comprising a slider covering said removable hard disk drive, said rear stopper, and said removable front stopper, said slider being placed above or on one side of or above and extending over one side of said electronic device.

4. The electronic device according to claim 1 wherein said electronic device is a receiver for receiving at least one of audio and video signals.

5. An electronic device, comprising:
   a housing operative to receive a removable hard disk drive, said housing comprising first and second lateral walls opposite one another with respect to said removable hard disk drive, said removable hard disk drive being installed into said housing according to a fixed guide direction parallel to said first and second lateral walls; and
   a rear stopper and a removable front stopper positioned opposite one another with respect to said removable hard disk drive and operative to lock said removable hard disk drive in said housing according to said fixed guide direction, wherein said rear stopper is adapted to block movement of said removable hard disk drive in a first direction and said removable front stopper is adapted to block movement of said removable hard disk drive in a second direction opposite to said first direction;
   wherein said removable front stopper comprises:
   a first end including a clip coupled to said first lateral wall;
   a second end including a lock coupled to said second lateral wall;
   a hinge enabling articulation of said removable front stopper around said first end; and
   a flexible arm holding said removable hard disk drive in said housing, wherein said removable front stopper is a unitary plastic piece.

6. The electronic device according to claim 5 wherein a base of said housing is metallic.

7. The electronic device according to claim 5 further comprising a slider covering said removable hard disk drive, said rear stopper, and said removable front stopper, said slider being placed above or on one side of or above and extending over one side of said electronic device.

8. The electronic device according to claim 5 wherein said electronic device comprises a receiver for receiving at least one of audio and video signals.

9. A method for providing an electronic device, said method comprising:
   providing a housing operative to receive a removable hard disk drive, said housing comprising first and second lateral walls opposite one another with respect to said removable hard disk drive, said removable hard disk drive being installed into said housing according to a fixed guide direction parallel to said first and second lateral walls; and
   providing a rear stopper and a removable front stopper positioned opposite one another with respect to said removable hard disk drive and operative to lock said removable hard disk drive in said housing according to said fixed guide direction, wherein said rear stopper is adapted to block movement of said removable hard disk drive in a first direction and said removable front stopper is adapted to block movement of said removable hard disk drive in a second direction opposite to said first direction;

wherein said removable front stopper comprises:
- a first end including a clip coupled to said first lateral wall;
- a second end including a lock coupled to said second lateral wall;
- a hinge enabling articulation of said removable front stopper around said first end; and
- a flexible arm holding said removable hard disk drive in said housing, wherein said removable front stopper is a unitary plastic piece.

10. The method according to claim 9 wherein a base of said housing is metallic.

11. The method according to claim 9 further comprised of providing a slider covering said removable hard disk drive, said rear stopper, and said removable front stopper, said slider being placed above or on one side of or above and extending over one side of said electronic device.

12. The method according to claim 9 wherein said electronic device is operative to receive at least one of audio and video signals.

* * * * *